Figure 1:
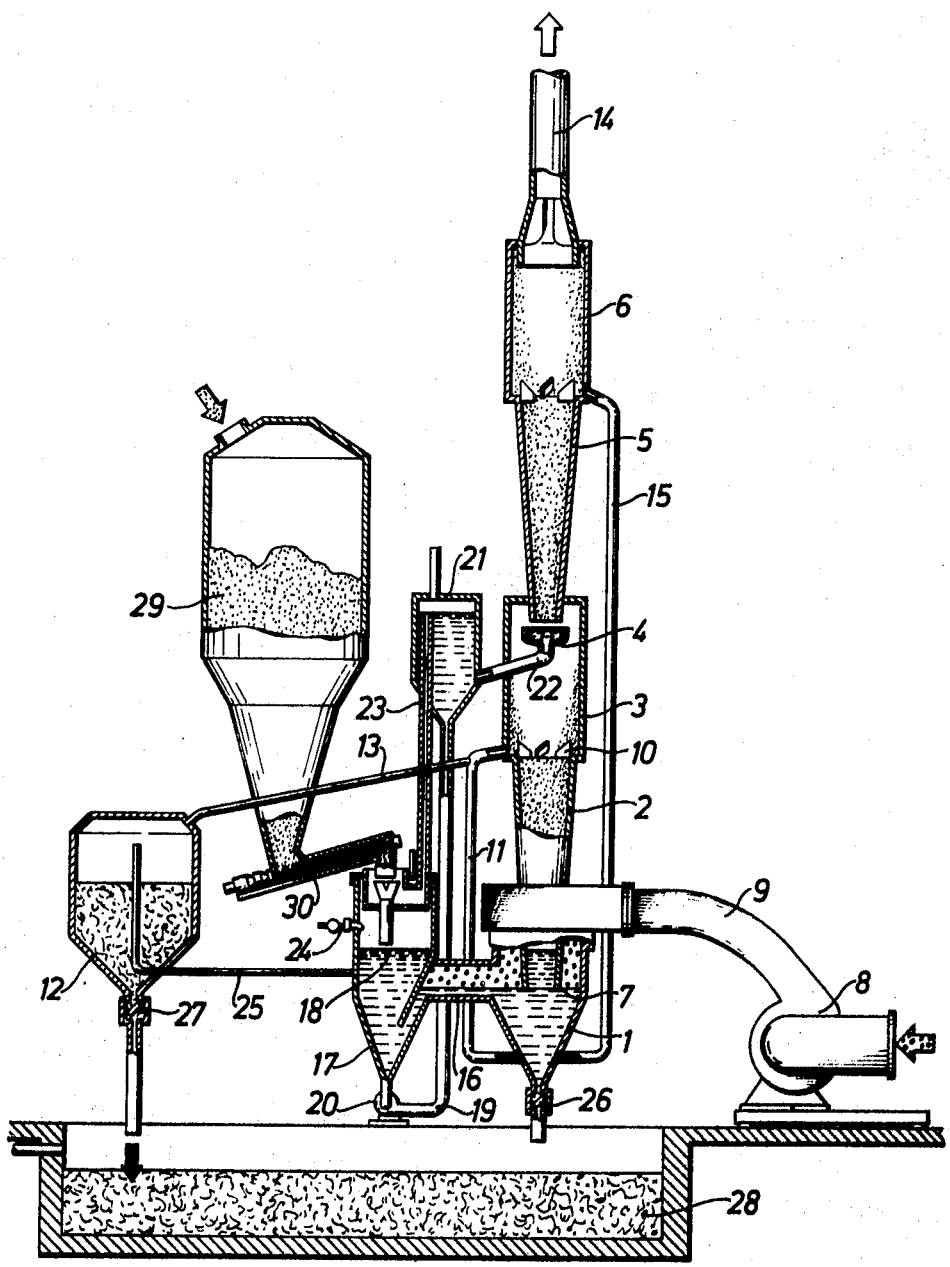

United States Patent [19]

Gustavsson

[11] 3,640,053
[45] Feb. 8, 1972

[54] APPARATUS FOR CLEANSING FLUE GASES

[72] Inventor: Karl-Axel Goran Gustavsson, Enkoping, Sweden

[73] Assignee: Aktienbolaget Bahco Ventilation, Enkoping, Sweden

[22] Filed: June 1, 1970

[21] Appl. No.: 42,231

Related U.S. Application Data

[63] Continuation-in-part of Ser. No. 763,424, Sept. 27, 1968, abandoned.

[30] Foreign Application Priority Data

June 2, 1969 Sweden...................................7759/69

[52] U.S. Cl...................................55/227, 23/2 R, 23/178, 23/284, 55/228, 55/236, 55/248, 261/79 A
[51] Int. Cl.........................................................B01d 47/02
[58] Field of Search......................55/73, 84, 85, 89, 95, 225, 55/226, 227, 228, 235–239, 244, 248, 257, 260, 339, 340; 261/79 A, 119; 23/225, 226, 178, 2 SQ, 2, 284

[56] References Cited

UNITED STATES PATENTS 2,142,406  1/1939   Nonhebel et al...................55/228
2,792,905  5/1957   Forrest..................................55/227
3,315,443  4/1967   Marino..................................55/228
3,527,026  9/1970   Miura....................................55/239

FOREIGN PATENTS OR APPLICATIONS 1,191,954  5/1970   Great Britain..........................55/84

Primary Examiner—Bernard Nozick
Attorney—Harry Cohen

[57] ABSTRACT

The invention relates to an apparatus for purifying the gases to remove sulphur dioxide. The apparatus comprises a container for a body of treatment liquid and is provided with a gas inlet so arranged that the gas is caused to flow substantially at right angles to the surface of the liquid therein. A treatment passage extends substantially vertically upwards from the liquid surface in the container, so that the gas after contact with the liquid flows substantially linearly therethrough entraining droplets of liquid. The container communicates below the liquid level with an equalizing tank having means for introducing alkali thereinto to maintain the treatment liquid at a suitable alkalinity and with means for introducing fresh water. The equalizing tank also has means to maintain the liquid level therein constant whereby the liquid level in the treatment container adjusts automatically to variations in the rate of gas supplied thereto. The invention also includes means in the equalizing tank for accelerating the admixture of powdered alkali in the liquid.

2 Claims, 2 Drawing Figures

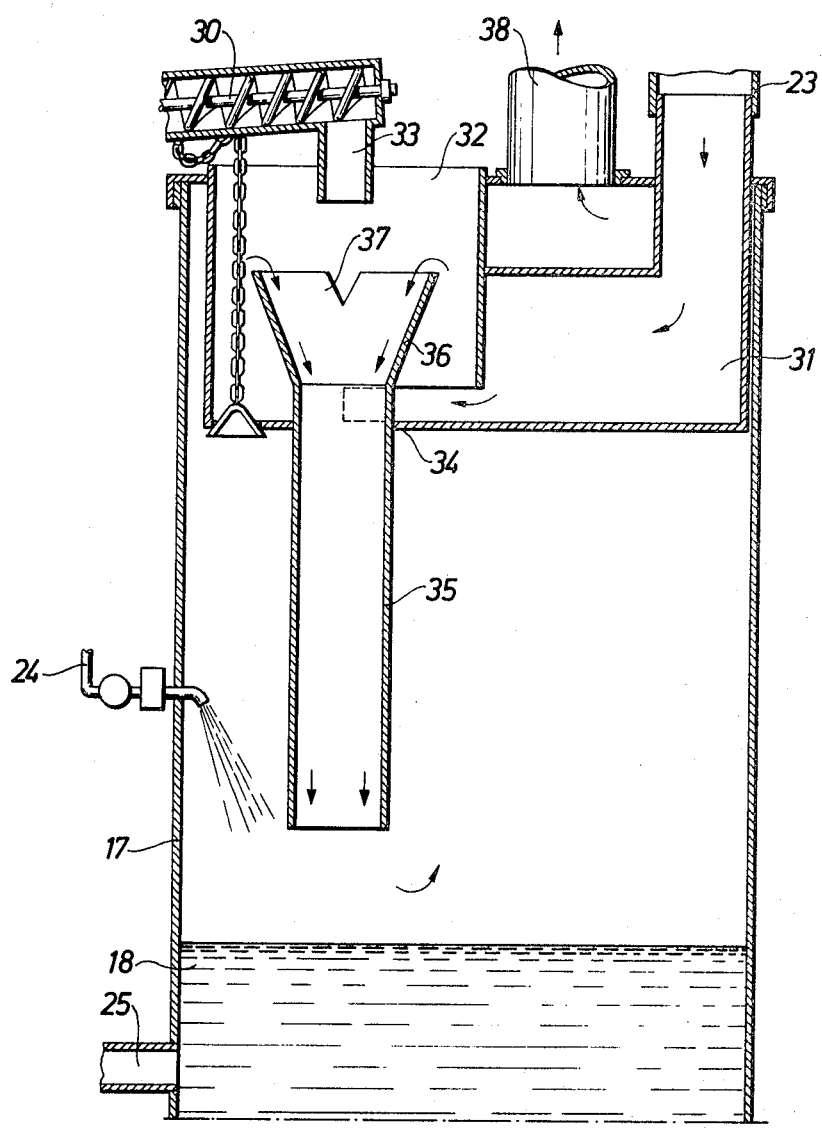

APPARATUS FOR CLEANSING FLUE GASES

This application is a continuation-in-part of our copending application Ser. No. 763,424 filed on Sept. 27, 1968 now abandoned.

The present invention is concerned with an apparatus for removing impurities, primarily $SO_2$ and secondarily solid products of combustion such as soot, coke dust and ash, from flue gases.

The discharge of flue gases from different firing plants, e.g., oil firing plants, and waste gases from industrial processes represents a problem of increasing magnitude, mainly because of the quantities of $SO_2$ and soot which impurify the air as a result thereof. Consequently, it is becoming more and more urgent to find ways and means for the removal of such impurities from the flue gases in an effective and economic manner, in order to prevent the damage which such impurities cause, such as corrosion, poisoning of vegetation, smog formation etc. From the point of view of economy the discharge of $SO_2$ would seem to be the most harmful of these impurities, as a result of the damage it causes due to corrosion.

The sulphur dioxide can be absorbed on solid substances having a wide specific surface, e.g., activated carbon or some other strongly expanded material, but the decontamination of these materials with soot and absorption of steam from the gases of combustion greatly impairs their utility in practice, since they would require an extensive exchange service and servicing program, resulting in too high costs.

It is also possible to cleanse the oil from sulphur in connection with the production process, but this would cause the price of oil to rise to such an extent that this possibility cannot be accepted.

A third method of removing sulphur impurities from flue gases is based on the well-known fact that the $SO_2$ is readily absorbed in alkaline aqueous solutions. Two problems associated herewith, however, are first that a sufficient contact surface between the alkaline treatment liquid and the $SO_2$ bearing gas must be obtained, and secondly the length of time during which the gas and liquid are in contact must be sufficient to allow for practically 100 percent absorption.

It is possible to obtain a wide contact surface by atomizing the alkaline treatment liquid. An obvious expedient for this purpose is the use of nozzles working under pressure. However, nozzles are prone to become blocked, worn and corroded, particularly when working with sludge-bearing liquids. A more advantageous effect is obtained with an apparatus in which the liquid is atomized or broken down by causing the gas to attack the surface of the treatment liquid at high speed. The gas then carries the drops of water up through a vertical treatment passage, the lower end of which terminates immediately above the surface of the liquid, and in which the absorption process is effected.

The other requirement to be fulfilled is one of sufficient contact time. This can be provided for by successively reducing the velocity of the gas during the flow upwards through the vertical treatment passage, which is designed as a diffusor for this purpose. In this way an appreciable portion of the kinetic energy of the gas is also recovered, and can be applied to break down the liquid.

The treatment passage or column is kept filled during the treatment process, with drops of the treatment liquid or absorption liquid itself. Thus, this column differs to advantage from such columns which in order to provide for the requisite contact surface are filled with packing bodies, which are overrun with liquid passed by a gas flowing slowly through the column, whereby very heavy structures result and the bed of packing bodies tends to become blocked with solid impurities in the gas or with the absorption agent.

By maintaining a suitable liquid level, gas velocity upon liquid entrainment and the angle at which the passage widens out it is possible to obtain very good filling of the passage with suspended droplets which absorb $SO_2$ and which by depositing on the walls and being recirculated to the liquid bath can also lead away the absorbed $SO_2$.

One problem associated with an apparatus of the aforementioned type, however, is that the treatment process is sensitive to variations in the distance between the level of the liquid in the container and the lower end of the passage, which is a decisive factor for the size of the droplets entrained by the gas, and hence for a given space velocity of the gas a truly effective effect is only obtained within a very narrow range for said distance. The process is thus difficult to control in the manner desired. Furthermore, it has been found than an apparatus of given dimensions functions best within a rather small range for the gas supply.

To enable the absorption arrangement to be controlled more easily and, at the same time, better suited for use with widely varying gas supply it is possible, according to the previous suggestion, to arrange an annular slot at the lower end of the treatment column, at such a height above the normal level of the liquid that an essentially liquid-free part flow of gas passes through the slot. The effect of this annular flow of gas on the liquid droplets is to break down the droplets in the treatment column into considerably smaller droplets, whereby the amount of liquid which exists in droplet form in the treatment column increases considerably. The apparatus is thus less sensitive to variations in the liquid level and, at the same time, also functions well with a more varying gas supply. The portion of the outlet passage below the slot can be produced in the form of a vertically movable connection pipe whose position vertically can be adjusted. The connection pipe can be arranged freely movable so that it automatically adjusts the width of the slot under the influence of the gas flow. However, it has been found that although this arrangement functions satisfactorily for a relatively long period of time it does in the course of time become less effective in apparatus for separating sulphur dioxide with the aid of alkali, particularly when the alkali is lime since sludge deposits form on the stationary surface of the apparatus of the slot, and thereby impairs its function.

The object of the present invention is to provide for automatic adjustment of the said liquid level in relation to the lower end of the treatment column under the influence of variations in the gas flow, so that the apparatus automatically adjusts itself to the prevailing gas flow, without the use of movable parts whose function might be impaired by blockages. This object is achieved by means of the present invention in that the container which houses the body of liquid and from which the treatment column extends communicates below the level of the liquid with an equalizing container or surge tank, the liquid level of which is held constant. Upon variations in the gas flow, and the subsequent changes in pressure above the body of liquid as a result thereof, the level of the liquid below the lower end of the treatment column will rise or fall, in accordance with the known principle for communicating vessels, so that the level of the liquid adjusts itself in response to the gas flow.

The invention is thus concerned with an apparatus for cleansing flue gas from primarily $SO_2$, and includes a container adapted to accommodate a quantity of treatment liquid and provided with a gas inlet so arranged that the gas is caused to flow substantially at right angles down towards the surface of the liquid in the container; and a treatment column directed essentially perpendicularly to the surface of the liquid and through which the gas flows essentially linearly away from the surface of the liquid while entraining droplets of liquid therefrom, and wherein the said container below the liquid level communicates with an equalizing tank provided with means for maintaining the level of the liquid therein constant.

Among the alkalis which can be used as treatment or absorption agents are primarily sodium hydroxide (caustic soda) and calcium hydroxide (hydrated lime). The caustic soda is obviously a more superior absorption agent, but since it is much too expensive aqueous calcium hydroxide is generally used.

The hydrated lime may conveniently be metered direct in powder form to the equalizing tank, which may thus simultaneously serve as a dissolver, by means of a screw conveyor or other mechanical devices. The strong circulation of water effects the mixing and dissolving of the substances. Metering of the lime can also be controlled by instruments for controlling the pH value of the return liquid from the top of the treatment column, so that an alkali of pH 7–11 is maintained there. The lime solution thus becomes supersaturated in remaining parts of the system, and conventional iron plate can be used as construction material without too much risk for corrosion.

The only waste product is the sludge formed by the consumed hydrated lime and solid constituents and sulphur compounds washed from the flue gas. The sludge can be tapped off intermittently, through a pocket under the liquid bath. However, it is desirable to obtain a higher concentration than that obtained by self-sedimentation, and accordingly a fully automatic operating sludge thickener can be connected in the return circuit for the return liquid so that the sludge is discharged in the form of a concentrated paste while the liquid freed from sludge is passed back to the liquid bath. This liquid may suitably be returned so that it flushes the walls of the container free from any sludge which might have settled thereon.

The apparatus may include more than one treatment stage, wherewith subsequent to its exit from the treatment column and the droplet separating process the gas treated in the manner described above is caused to attack the surface of another liquid in a second container, and is passed through a further treatment column. In this instance a level regulator of the above-described type is also incorporated in the second stage. The two equalizing tanks may also be connected together in a suitable manner.

The equalizing tank also serves as a dissolver for the powdered solid alkali and the present invention also provides means for facilitating the introduction of powdered alkali into the liquid in the equalizing tank.

For the aforementioned purpose, there has hitherto been employed a tank into the upper portion of which lime is fed by means of a screw conveyor and caused to fall down directly onto the water contained in the lower portion of the container. It has been found with such an apparatus that the function of the screw conveyor is seriously impaired by the fact that water vapor from the lower portion of the container enters the conveyor and causes the powdered lime therein to agglomerate.

The present invention intends to avoid this disadvantage and to construct the apparatus in a manner which hastens the mixing of the powder in the liquid. Accordingly, the apparatus is mainly characterized in that mounted in the upper portion of the apparatus is an inner liquid container which is connected to a conduit for supplying liquid therein and communicating with the outer container through a vertical tube, the upper end of which is placed over the bottom of the inner container and so that the outlet of the means feeding the powdered material is located immediately thereabove.

With this apparatus a downwardly passing flow of liquid is produced, which tends to drive water vapor arriving from the lower portion of the apparatus away from the area at which the powdered material is charged to the apparatus, so that no steam can reach the charging means. When the powdered material is fed directly into the liquid flow an effective mixing of the powder with the liquid is obtained, which contributes towards rapid dissolving of the powder.

The invention will now be described in more detail with reference to an embodiment thereof illustrated in the accompanying drawing, in which FIG. 1 is a flue gas cleansing apparatus constructed in accordance with the invention, and FIG. 2 is a cross-sectional view of the upper portion of the lime dissolving equalizing tank shown in FIG. 1.

The flue gas cleansing means shown in FIG. 1 functions in accordance with the principle whereby a flow of gas is directed at right angles down towards a body of liquid and then made to flow substantially vertically upwards from the body of liquid and then made to flow substantially vertically upwards from the body of liquid, while entraining droplets of liquid, and through a treatment chamber, in which the gas and liquid are held in contact with each other for a long period of time. The liquid droplets are separated from the gas at the upper end of the treatment chamber and returned to the body of liquid while the purified gas leaves the chamber. A lime solution is used in the apparatus as an absorption liquid for taking up sulphur dioxide. The lime solution is prepared by introducing to a lime dissolving means, which communicates with the container holding the body of liquid, a quantity of powdered lime corresponding to the quantity consumed (by forming a calcium sulfite).

In the shown embodiment the gas is treated in two stages and the treatment apparatus (the scrubber) is therefore provided with a lower liquid container 1, a lower treatment chamber 2, a lower droplet separator 3, an upper liquid container 4, an upper treatment chamber 5 and an upper droplet separator 6.

The lower liquid container 1 contains absorption liquid up to a level 7, which while the apparatus is in operation is maintained at a small distance below the lower end of the treatment chamber 2, which comprises an upwardly slightly conical, expanded tube whose lower part projects down into the container 1.

The gas to be cleansed is fed by means of a fan 8 through a line 9 into the upper portion of the container 1 in a manner whereby it flows substantially at right angles down against the surface 7, whereafter it continues up through the chamber 2. The gas thus breaks the liquid at the surface into fine droplets, which are entrained with the gas through the treatment chamber, which is therefore constantly filled with a mixture of gas and liquid droplets. The liquid absorbs in the treatment chamber any solid impurities contained by the gas and sulphur dioxide therefrom.

The mixture of gas and liquid droplets is suitably caused to rotate by means of blades 10 before entering the drop separator 3, where the liquid is separated and returned to the liquid container 1, the liquid passing through the chamber 2, a conduit 11 and a settling tank 12 connected to the conduit 11 by means of a branch conduit 13.

The described treatment sequence is repeated in the body of liquid in the container 4 arranged at the upper portion of the drop separator 3, the treatment chamber 5 and the droplet separator 6, wherefrom the cleansed gas departs through the outlet 14 and the liquid returns through a conduit 15 to the container 1.

The container 1 communicates via a conduit 16 with an equalizing and lime dissolving tank 17 which serves at the same time as a level regulating vessel, the liquid level 18 in the vessel 17 being maintained constant for the purpose of controlling the level of the liquid in the container 1. The tank is also provided with a liquid supply conduit having a valve 24. The container 17 may, for instance, be provided with a float which opens the valve 24 when the liquid level 18 tends to fall, and also with a spillway (not shown) by way of which the liquid departs when the level rises. The lower portion of the tank 17 communicates through a conduit 19 having a pump 20 with an upper equalizing tank 21, which communicates with the upper container 4 through a conduit 11 and which has a vent opening to the atmosphere. The liquid in the vessel 21 is maintained at a constant level by means of a spillway 23, which passes the liquid back to the lime dissolving tank 17.

Liquid is passed to the lime dissolving tank from the settling tank 12 through the conduit 25.

The sludge formed when the apparatus is in operation (the sludge comprising calcium sulfite, calcium sulfate, calcium carbonate etc.) settles partly in the container 1 and partly in the settling tank 12, the major part of the sludge settling here, and can be tapped off to a sludge tank 28 through bottom outlets 26, 27 provided with valves.

In order to replace the lime consumed during the process, powdered lime is fed by means of a screw 30 from a bin 29 to the lime dissolving means 17. The feed can be regulated, for example, by determining the pH of the liquid in the conduit 13 or in some other manner.

The temperature of the liquid, when the apparatus is in operation is relatively high. Heat is also developed when the lime is dissolved in the liquid. As a result steam is formed in the lime dissolving tank 17. It has been discovered that, when the apparatus is in operation, the steam is liable to cause disturbances in the work of the screw 30 since the powdered lime is baked into agglomerates therein. To avoid this, the lime dissolving tank has been given the construction illustrated in FIG. 2.

Arranged in the upper portion of the lime dissolving tank is a liquid container 31 which is connected to the conduit 23 extending from the vessel 21, whereby return liquid from the vessel flows into the container 31. The container 31 is open at the top thereof, at 32, and the outlet 33 of the screw is placed in this opening. The container 31 also has an opening 34 arranged in the bottom thereof and positioned immediately beneath the outlet 33. Extending through the opening 34 is a tube 35, the lower end of which is situated slightly above the liquid level 18 in the lime dissolving means 17. The upper end 36 of the tube is funnel shaped and a number of recesses 37 can suitably be arranged in the upper end of the funnel.

When the apparatus is in operation, liquid flows from the conduit 23 to the container 31 and over the upper edge of the funnel 36 down in the tube 35 to the main part of the lime dissolving means. This flow of liquid creates a downward flow of air through the conduit 35 which drives the steam away, causing the steam to pass to atmosphere through the outlet 38. Consequently no steam will reach the screw 30. The powdered lime is fed down into and received by the liquid flowing through the tube, with which it is rapidly mixed.

The outlet 37 serves to concentrate the flow of liquid to determined points around the periphery of the tube, thereby further improving the effect.

I claim:

1. An apparatus for cleansing flue gases, primarily $SO_2$, which includes a container adapted to accommodate a quantity of alkaline treatment liquid, gas inlet means communicating with the container and arranged so that the gas is caused to flow substantially at right angles down towards the surface of the liquid in the container, a treatment passage connected to the container and directed essentially perpendicular to the surface of the liquid and through which the gas flows essentially linearly away from said surface of the liquid while entraining droplets of liquid therefrom, a droplet separator connected to the outlet of the treatment passage, an equalizing and alkali dissolving tank communicating with said container below the liquid level therein, a settling tank means for removing solid material from the treatment liquid, conduit means providing communication between said droplet separator and said settling tank means for passing treatment liquid to said settling tank means, conduit means providing communication between said settling tank means and said container for returning liquid from said settling tank means to said container, means for maintaining a constant liquid level within said equalizing and alkali dissolving tank, said means including a liquid inlet and a liquid outlet, and solid material feeding means in communication with said equalizing and alkali dissolving tank for supplying alkali in solid form to the liquid in the latter to maintain the alkalinity of said treatment liquid.

2. An apparatus as claimed in claim 1, including, in the upper portion of said equalizing and alkali dissolving tank, an inner liquid container, which communicates with the outer tank through a vertical tube, the upper end of which is located above the bottom of said inner container and vertically below the outlet of said solid material feeding means.

* * * * *